J. H. CORNISH.
MILK RELEASING MEANS IN VACUUM OPERATED MILKING MACHINES.
APPLICATION FILED MAY 2, 1913.

1,116,021.

Patented Nov. 3, 1914.

Witnesses:—
Charles B Brompton
Fred Pohl

J. H. Cornish.
Inventor.
By Croydon Marks
Attorney.

UNITED STATES PATENT OFFICE.

JOSEPH HARVEY CORNISH, OF BARHAM, NEW SOUTH WALES, AUSTRALIA.

MILK-RELEASING MEANS IN VACUUM-OPERATED MILKING-MACHINES.

1,116,021. Specification of Letters Patent. Patented Nov. 3, 1914.

Application filed May 2, 1913. Serial No. 765,139.

*To all whom it may concern:*

Be it known that I, JOSEPH HARVEY CORNISH, a subject of the King of Great Britain, residing at Barham, in the State of New South Wales, Commonwealth of Australia, have invented certain new and useful Improvements in Milk-Releasing Means in Vacuum-Operated Milking-Machines, of which the following is a specification.

This invention relates to releasers in milking machines whereby the milk as it is drawn from a cow or cows and flows into a suitable receptacle in the vacuum system may be discharged therefrom without seriously affecting the vacuum.

The invention consists in attaching to the milk vat or receptacle a cylinder in internal communication therewith and containing a rotating member in which are compartments which, as they come over the internal opening in the cylinder or vat, receive a supply of milk from the latter. As the rotating member revolves the milk so received will be discharged through the lower part of the cylinder or preferably directly from the said member into a can or other utensil provided for the purpose.

The rotating member may be divided into sectoral compartments or it may be a drum having peripheral recesses for receiving the milk, the object of the invention being to receive the milk into the rotating member and to discharge it without the vacuum pressure in the vat being seriously reduced.

In the accompanying drawing I have shown one way of effecting the purpose of my invention, in which—

Figure 1:
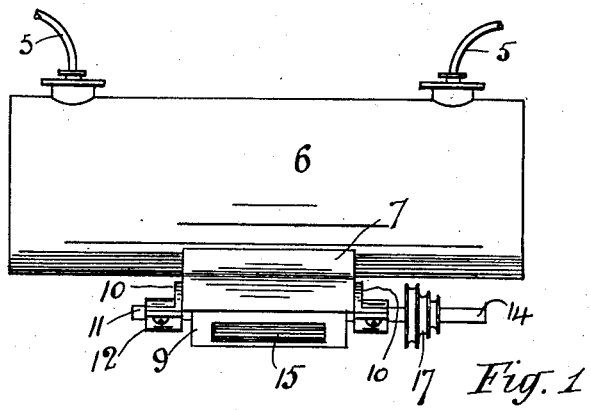
Figures 2, 3:
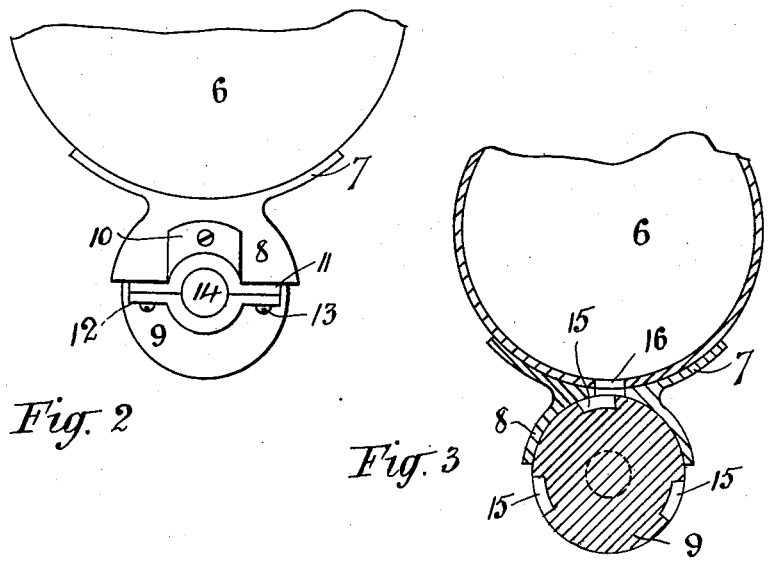
Figure 4:
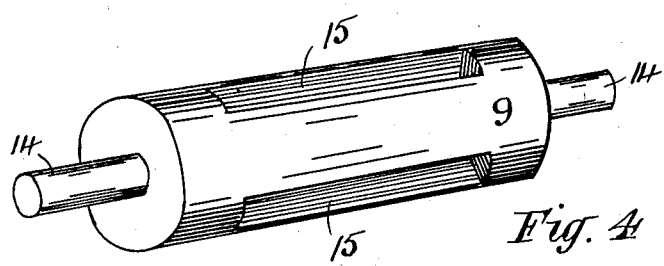

Figure 1 is a side elevation of a milk vat or receptacle with the releaser in position. Fig. 2 is an end elevation, and Fig. 3 a transverse sectional elevation of the same. Fig. 4 shows in perspective the recessed rotating member I employ.

The milk pipes 5, 5, are attached to the vat or compartment 6 which is preferably cylindrical in shape and rests in the cradle 7 that is integral with the semi-circular hood 8. The hood would be part of the cylinder containing the rotating member 9, but I have found that the said member need not be entirely enveloped in a container and consequently I have dispensed with the lower half of the cylinder. On the hood 8 is a plate 10 made integral with the bearing piece 11 to which the complementary piece 12 is secured by screws 13.

The member 9 is held in the bearing on spindles 14 and on its longitudinal surface are recesses 15 at intervals about the same. In the lower part of the vat 6 is an opening 16 which coincides with a like orifice in the hood 8, through which the milk in the vat can flow to one of the recesses 15 as the drum 9 rotates. The latter is slowly moved by any suitable means such as by a belt and the pulleys 7, and is kept in close contact with the inside surface of the hood 8 by the bearing and screws 13 which are adjusted to insure member 9 rotating easily in contact with the hood. As member 9 is rotated the recesses 15 will, one by one, come opposite the orifices 16 and will receive a supply of milk which will be retained therein until the recess has moved past the lower edge of the hood, when the milk will be discharged. If the drum 9 is entirely contained there will be a discharge orifice near the bottom of its enveloping cylinder. I however, prefer to leave the lower half of the drum uncovered as such construction is simpler, cleaner and enables any wear upon the surfaces to be readily taken up in the manner explained, thus preventing any appreciable loss of vacuum, which in my invention need only be affected by the air in the recesses 15 as they successively communicate with the vat.

Having now described my invention what I claim as new and desire to secure by Letters Patent is:—

1. A milk releaser, comprising in combination, a cylindrical member having a plurality of compartments therein, means for rotating said member, a container in close contact with which said member rotates, and a vacuum milk vat communicating with the container, said container having an opening through which the milk is delivered into the compartments of the cylindrical member, from which compartments the milk is discharged by gravitation.

2. A milk releaser, comprising in combination, a cylindrical member having a plurality of longitudinal recesses therein, bearings in which said member is rotatably mounted, means for rotating said member, a container in close contact with which said member rotates, and a vacuum milk vat adjacent said container, having an opening coinciding with a like opening in the container, the milk being delivered through said openings into the recesses of the member as the latter rotates, and being discharged therefrom by gravitation.

3. A milk releaser, comprising in combination, a vacuum vat adapted to contain milk, an inverted trough like member having a cradle thereon upon which said vat is supported, a cylindrical member rotating in close contact therewith, said trough like member having the same radius as the said cylindrical member, said vat and trough like member being provided with an opening which at intervals coincides with longitudinal recesses in the cylindrical member, a support for said member, and bearing means on said support for adjusting the cylindrical member relatively to the trough like member, for the purpose set forth.

In testimony whereof I have affixed my signature in presence of two witnesses.

JOSEPH HARVEY CORNISH.

Witnesses:
P. M. NEWTON,
A. C. SMITH.